(12) United States Patent
Jeffery

(10) Patent No.: US 10,371,024 B2
(45) Date of Patent: Aug. 6, 2019

(54) VARIABLE DURATION VALVE SYSTEM

(71) Applicant: 2575168 ONTARIO INC., Chatham (CA)

(72) Inventor: John David Jeffery, Chatham (CA)

(73) Assignee: 2575168 ONTARIO INC., Chatham, Ontario (CA)

( * ) Notice: Subject to any disclaimer, the term of this patent is extended or adjusted under 35 U.S.C. 154(b) by 0 days.

(21) Appl. No.: 16/060,498

(22) PCT Filed: Dec. 9, 2016

(86) PCT No.: PCT/CA2016/000309
§ 371 (c)(1),
(2) Date: Jun. 8, 2018

(87) PCT Pub. No.: WO2017/096462
PCT Pub. Date: Jun. 15, 2017

(65) Prior Publication Data
US 2018/0363520 A1    Dec. 20, 2018

Related U.S. Application Data

(60) Provisional application No. 62/266,058, filed on Dec. 11, 2015.

(51) Int. Cl.
| *F01L 1/34* | (2006.01) |
| *F01L 13/00* | (2006.01) |
| *F01L 1/30* | (2006.01) |
| *F01L 1/352* | (2006.01) |

(52) U.S. Cl.
CPC ............. *F01L 13/0047* (2013.01); *F01L 1/30* (2013.01); *F01L 1/352* (2013.01); *F01L 2013/103* (2013.01); *F01L 2250/02* (2013.01); *F01L 2250/04* (2013.01); *F01L 2250/06* (2013.01)

(58) Field of Classification Search
CPC ......... F01L 13/0047; F01L 1/352; F01L 1/30; F01L 2013/103; F01L 2250/02; F01L 2250/04; F01L 2250/06
See application file for complete search history.

(56) References Cited

U.S. PATENT DOCUMENTS

| 1,541,069 | A | 6/1925 | Peters |
| 4,471,729 | A | 9/1984 | Eickmann |
| 6,752,107 | B2 * | 6/2004 | Kreuter ............... F01L 13/0005 123/198 F |
| 7,475,661 | B2 | 1/2009 | Taye et al. |

FOREIGN PATENT DOCUMENTS

| DE | 37 37 602 A1 | 5/1989 |
| GB | 2 224 075 A | 4/1990 |
| WO | WO 03/040525 A1 | 5/2003 |

* cited by examiner

*Primary Examiner* — Zelalem Eshete

(57) ABSTRACT

A valve assembly selectively varies the timing of the valves in an internal combustion engine cycle by way of a first and second camshaft. Each valve has a shuttle portion and a valve portion. Upper and lower cam followers on the shuttle portion engage with first and second cams on each of the first and second camshafts to move the valve between an open and closed position with reference to a valve seat on an engine block.

8 Claims, 8 Drawing Sheets

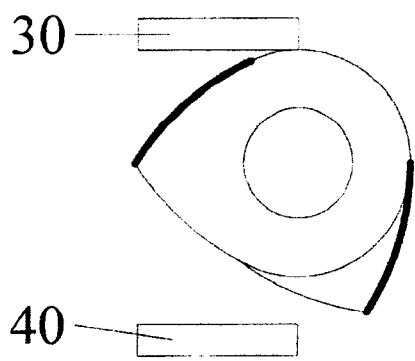
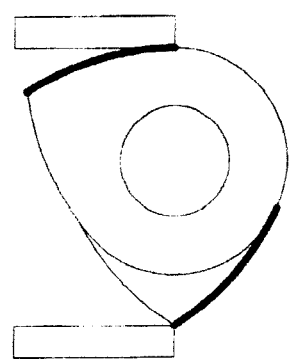
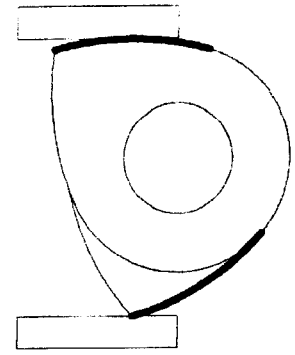
FIG. 3    FIG. 4    FIG. 5
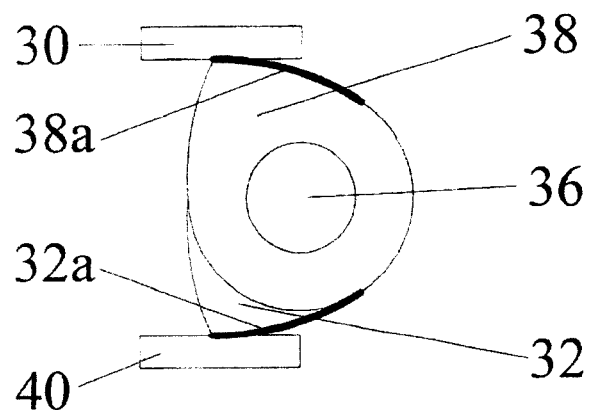
FIG. 6
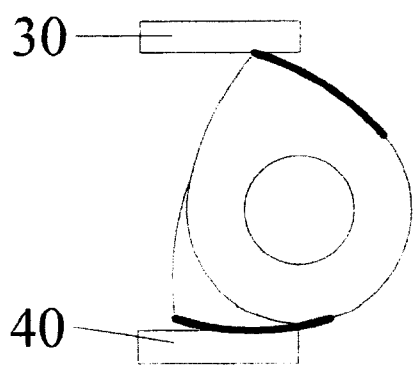
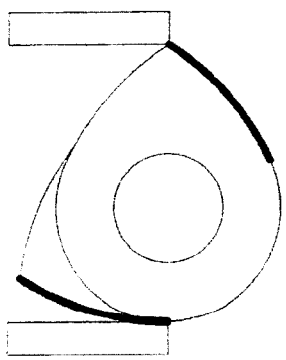
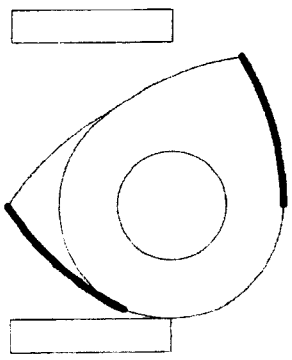
FIG. 7    FIG. 8    FIG. 9

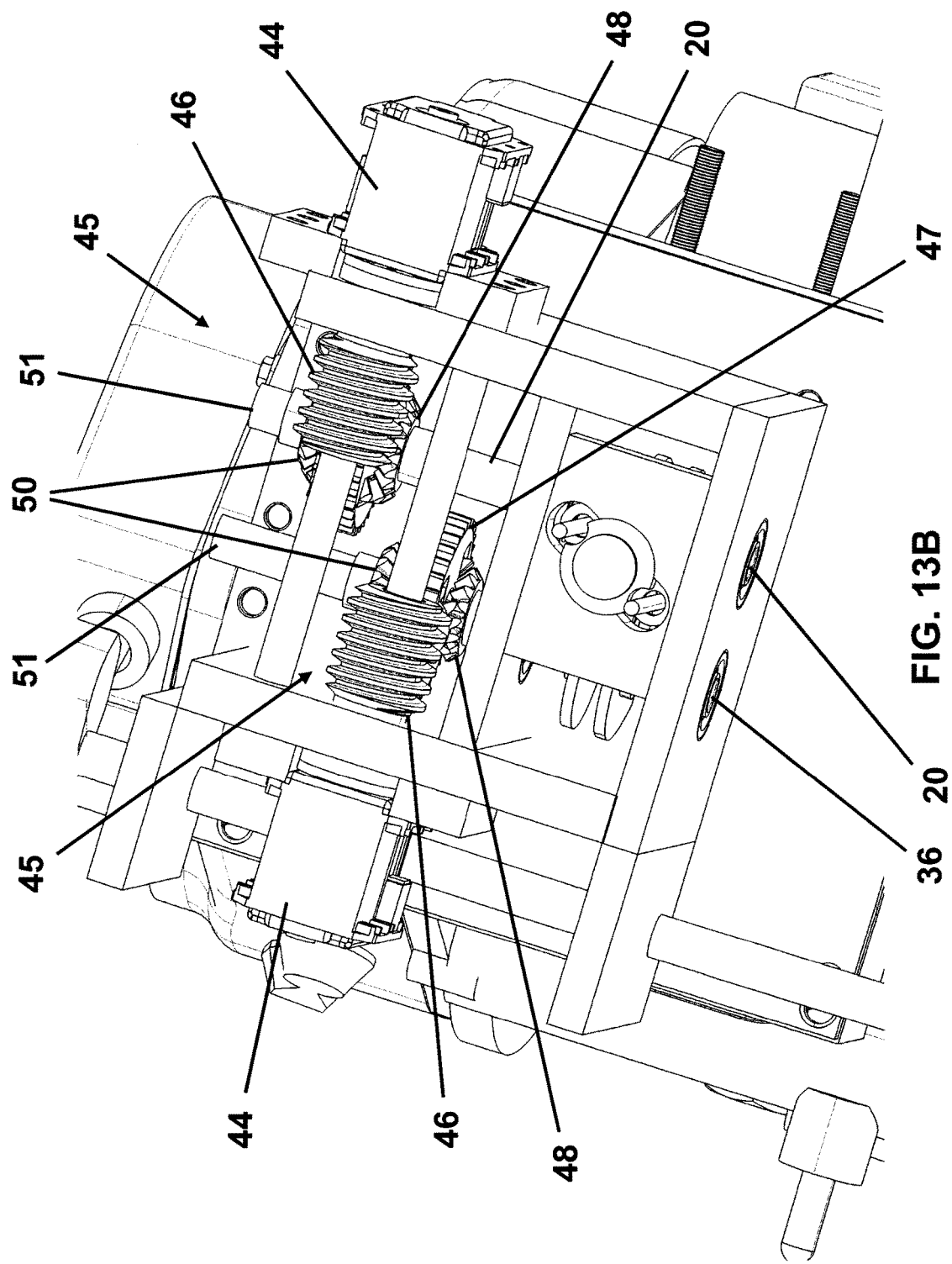

US 10,371,024 B2

VARIABLE DURATION VALVE SYSTEM

FIELD OF THE INVENTION

This invention relates to engine valve systems, in particular, to engine valve assemblies with variable valve timing.

BACKGROUND

Most engines' valve control systems provide fixed duration valve control, which is a compromise between valve timing that is optimal for slow engine speeds and valve timing that is optimal for fast engine speeds. Attempts have been made to provide variable duration valve timing. However, these systems are limited in the amount that the valve timing can be varied.

Some engines use variable lift valves to control engine speed. These are more efficient that engines that use throttles. However, they create a vacuum in the cylinder as the inlet valve is normally only partially lifted on the intake stroke. This vacuum during the intake stroke results in pumping losses in normally aspirated gasoline engines. Diesel engines have a pumping loss inefficiency caused by the fixed length compression, which generally compresses more gases than is required for combustion.

Some engines use turbochargers or superchargers to reduce the vacuum effect during the intake stroke by compressing gases before intake.

Prior art engines generally use springs to close the engine valves, which limits engine speed and requires robust construction of the valve train components.

SUMMARY OF THE INVENTION

A valve assembly having a valve, which moves between an open and closed position with reference to a valve seat on an engine block, having a valve portion and a shuttle portion. The valve portion has a valve stem and a valve head. The shuttle portion has a body with opposing sides, an upper cam follower on one side of the body, and a lower cam follower on the other side of the body;
a first and second cam on a first camshaft for opening the valve;
a first and second cam on a second camshaft for closing the valve; wherein
the first cam on the first camshaft engages the lower cam follower to initiate the opening movement of the valve, and the second cam on the first camshaft engages the upper cam follower to control the opening movement of the valve;
the first cam on the second camshaft engages the upper cam follower to initiate the closing movement of the valve, and the second cam on the second camshaft engages the lower cam follower to control the closing movement of the valve;
and wherein the valve has a first magnet target corresponding to the open position and a second magnet target corresponding to the closed position that magnetically engage with a magnet to releasably retain the valve in the open or closed position.

BRIEF DESCRIPTION OF THE DRAWINGS

In order that the invention may be more clearly understood, a preferred embodiment thereof will now be described in detail by way of example, with reference to the accompanying drawings, in which:

FIGS. 3-9 are schematic views of the cams engaged with the cam followers at different rotational positions of the camshafts.
FIG. 13B is another detail view of the control device of FIG. 13A.

DESCRIPTION OF THE INVENTION

A variable duration valve system, or valve assembly, according to the present invention, is camshaft driven to selectively vary the timing of the valves in an internal combustion engine cycle.

Figure 1:
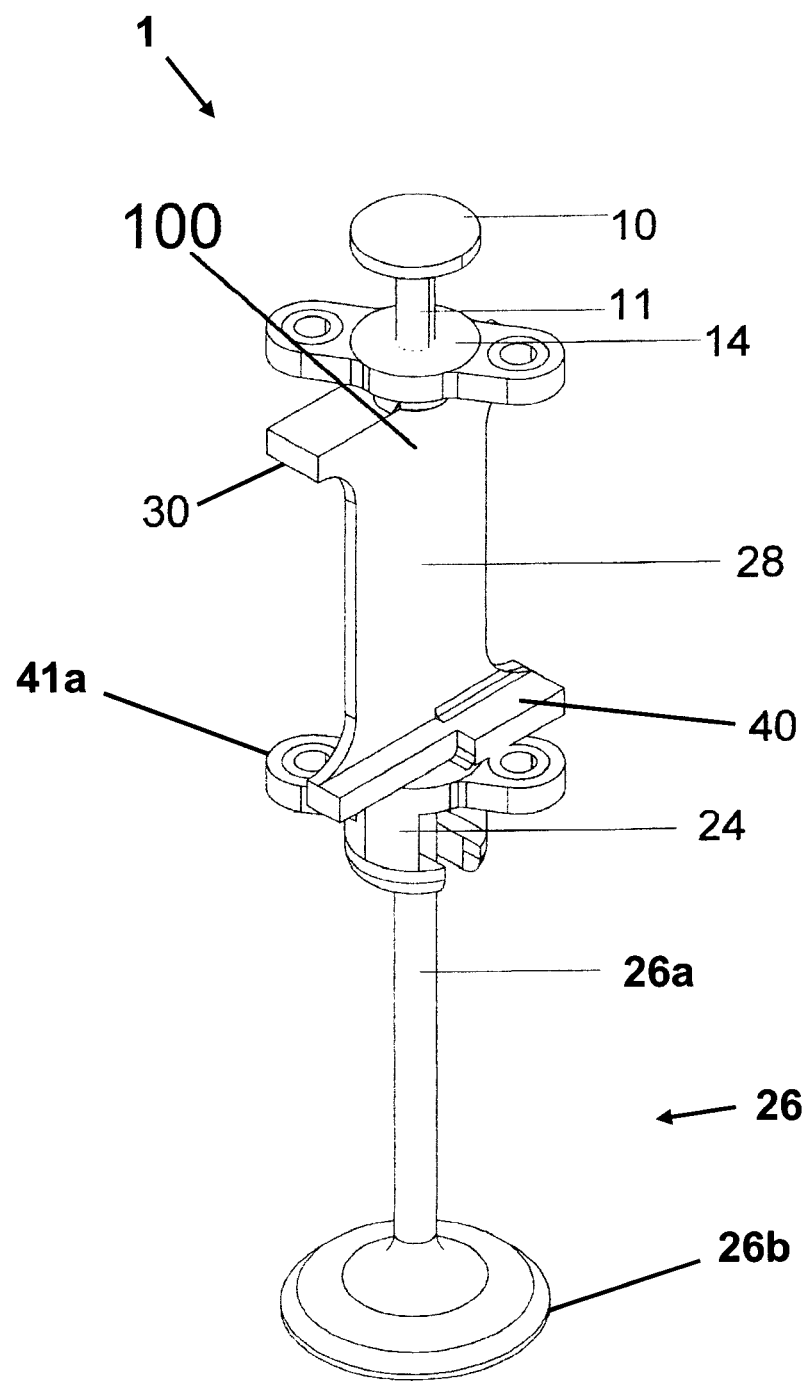
FIG. 1 is a perspective view of a valve of the variable duration valve system, according to the present invention.

As shown in FIG. 1, each valve 1 has a valve portion 26 and a shuttle portion 100 with upper cam followers 30, lower cam followers 40, a body 28 connecting the upper and lower cam followers 30 and 40, a magnet post 11, spaced-apart magnet targets 10 and 14, and a valve stem clamp 24. The valve portion 26 has a valve stem 26a and a valve head 26b and is attached to the shuttle portion 100, by way of the valve stem 26a, which is attached to the valve clamp 24. The valve portion 26 thereby moves with the shuttle portion 100. As used herein, the shuttle portion 100 may be referred to, interchangeably, as the shuttle portion 100 or the shuttle 100.

The engine in which the system operates is configured to guide the shuttle 100 in its movement to open and close the valve 1. For example, as shown in FIG. 2, the shuttle 100 may have guide sleeves 41a which are slidably mounted on guide rods 41 to guide valve movement between the open and closed position.

The upper and lower cam followers 30 and 40 are flat and extend from the opposing sides of the body 28, perpendicular to the direction of movement of the valve 1. The upper and lower cam followers 30 and 40 are offset from one another, such that cam lobes that contact one cam follower do not contact the other cam follower. As shown in FIG. 1, the upper cam follower 30 extends from one side of the body 28, while the lower cam follower 40 extends from the other side of the body 28.

Figure 2:
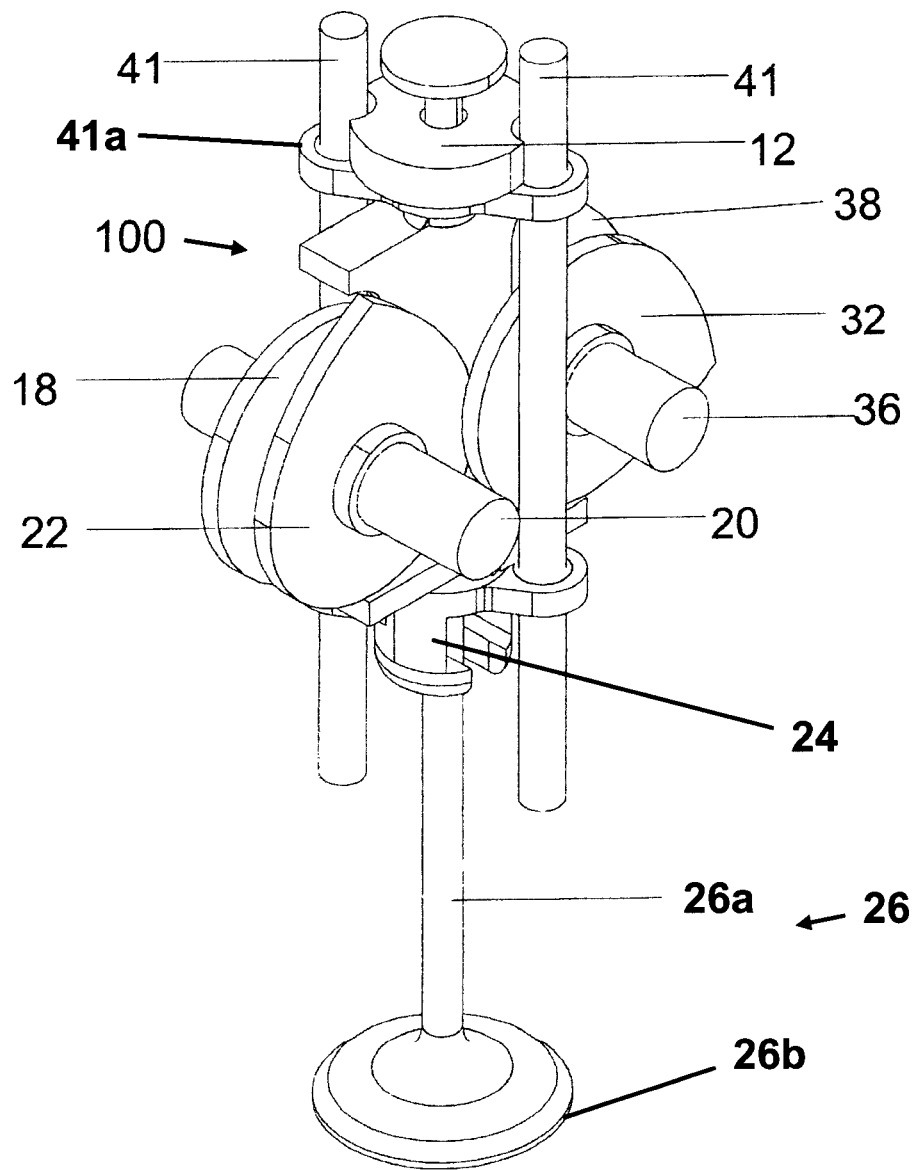
FIG. 2 is a perspective view of the valve of FIG. 1, showing the camshafts, guide rods, and magnet engaged with the valve.

As shown in FIG. 2, there are two camshafts 20 and 36 for each valve. One camshaft 20 controls the opening of the valve 1, while the other camshaft 36 controls the closing of the valve 1. The camshafts 20 and 36 are rotated at one-half engine rotation by way of timing belts, chains, or gears. Although the invention is described with reference to a single valve 1, the same camshaft may be used to open or close a plurality of valves in a valve bank. Camshaft rotation is illustrated as being clockwise in FIGS. 1 and 2, but the system may operate by rotating either camshaft in either direction.

The first open cam 22 on the camshaft 20 initiates the valve opening movement and the acceleration of the shuttle 100, with the attached valve portion 26, to its maximum opening speed. The second open cam 18 on the camshaft 20 controls the valve opening movement by decelerating and stopping the shuttle 100, with the attached valve portion 26, in the open position, with the valve 1 fully open. The minimum dimension, or base circle, of the first close cam 38 limits and maintains the height of the valve 26 in the open position. This occurs because, with the valve 1 in the open position, the upper cam follower 30 rides on the base circle of the first close cam 38. This positions the valve assembly to start the valve closing movement.

The first close cam 38 on the camshaft 36 initiates the initial valve closing movement and the acceleration of the shuttle 100, with the attached valve portion 26, to its maximum closing speed. The second close cam 32 on the camshaft 36 controls the valve closing movement by decelerating and stopping of the shuttle 100, with the attached valve portion 26, in the closed position. The seating of the valve head 26b on its valve seat controls the height of the valve 1 in the closed position.

During the opening and closing of the valve, the upper cam follower 30 engages with the second open cam 18 on the camshaft 20 and the first close cam 38 on the camshaft 36. The lower cam follower 40 engages with the first open cam 22 on the camshaft 20 and the second close cam 32 on the camshaft 36. Alternatively, two separate upper cam followers and two separate lower cam followers may be used, each engaging with only one cam.

As shown in FIG. 2, the magnet 12 is slidably fitted on the magnet post 11. The magnet 12 magnetically engages with the upper magnet target 10 to releasably retain the shuttle 100, with the attached valve portion 26, in the open position. The magnet 12 magnetically engages with the lower magnet target 14 to releasably retain the shuttle 100, with the attached valve portion 26, in the closed position. Alternative magnet and magnet target configurations may be used, and the magnets may be permanent magnets or electromagnets. Where electromagnets are used, switches or triggers may be employed to cause the magnets to be switched on or off when the shuttle 100 is in the appropriated positions.

FIGS. 3-9 show the upper and lower cam followers 30 and 40 engaging with the first and second close cams 38 and 32 on the camshaft 36 as it rotates in a clockwise direction to control the valve closing movement. The valve opening movement operates the same way, but in reverse, with the upper and lower cam followers 30 and 40 engaging with the first and second open cams 22 and 18 on the camshaft 20.

FIGS. 3 and 4 show the position of the cam followers 30 and 40 before the valve closing movement begins, with the valve 1 in the open position. FIGS. 4 and 5 show the cam face 38a pushing on the upper cam follower 30 to lift the cam follower 30 and initiate the valve closing movement.

FIG. 6 shows the cam positions when the valve 1 is halfway through the valve closing movement. At this point in the valve closing movement, the cam face 38a ceases to push the cam follower 30. The shuttle 100, with the attached valve portion 26, continue upward under their own momentum. The point of the first close cam 38 moves along the face of the upper cam follower 30. The lower cam follower 40 engages against the cam face 32a, under the momentum of the shuttle 100, with the attached valve portion 26.

FIGS. 7 and 8 show the second close cam 32 continuing to rotate. The lower cam follower 40 engages with the cam face 32a thereby controlling the movement of the shuttle 100, causing it to decelerate and eventually stop.

FIGS. 8 and 9 show the cam followers 30 and 40 and the first and second close cams 38 and 32 at the end of the valve closing movement, with the valve portion 26 in the closed position.

Figure 13A:
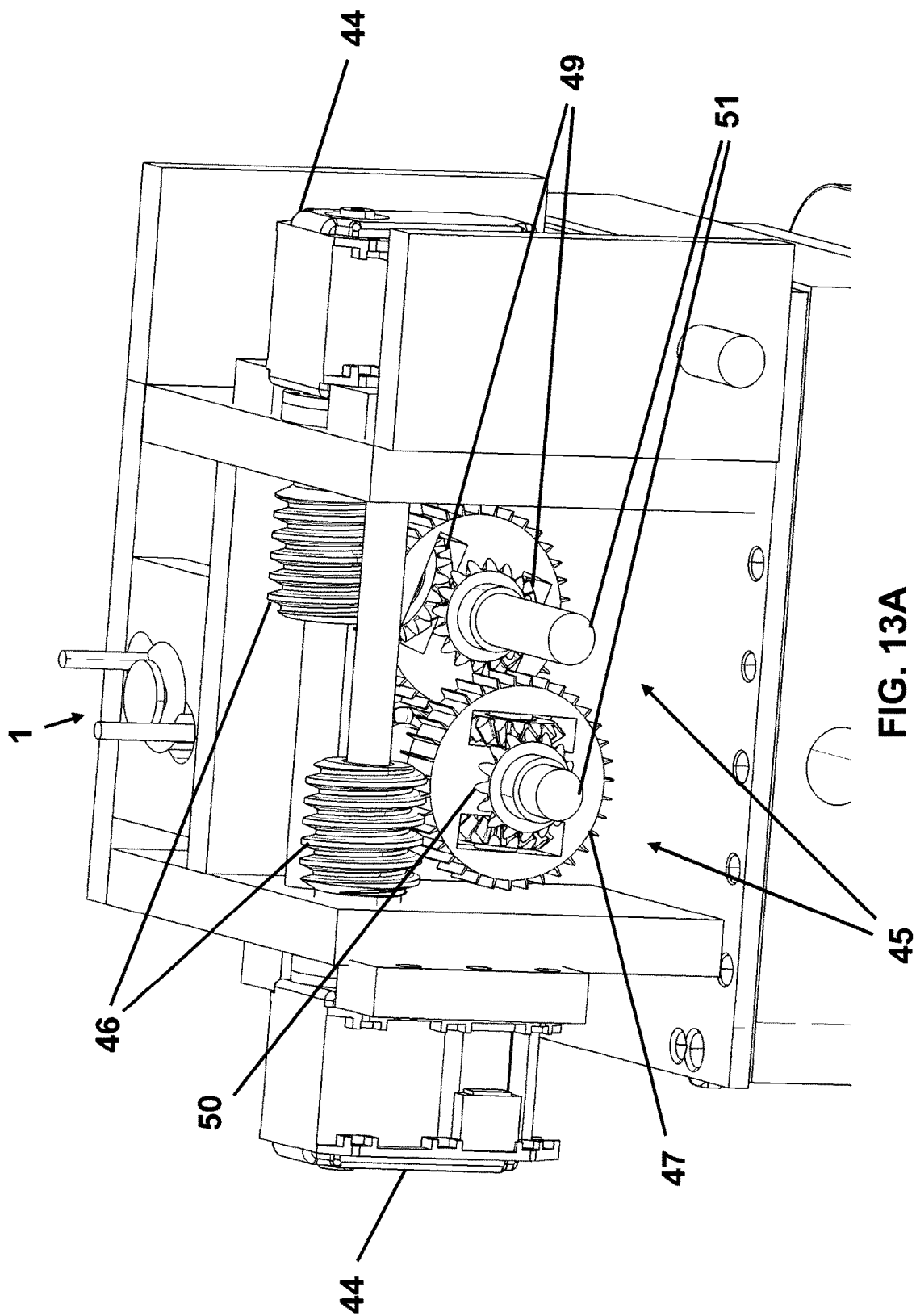
FIG. 13A is a detail view of the control device with surrounding elements removed to show the differential gear.

A variable timing control device controls the timing of each of the camshafts 20 and 36. Preferably, each camshaft is associated with a servo motor 44, which is connected to the vehicle computer (not shown), to control the timing of the valve assembly by way of differential gear assemblies 45. As shown in FIG. 13A, the servo motor 44 selectively rotates a worm gear 46, which controls the rotation of a ring gear 47. As shown in FIG. 13B, the camshaft has bevel gear 48, which is fixedly attached to the end of the camshaft and is engaged with the two bevel gears 49 rotatably attached on the ring gear 47. The normal rotation of the camshaft is driven by the stub shaft 51, by way of a bevel gear 50 fixedly attached to the end of the stub shaft 51 and engaged with the two bevel gears 49 on the ring gear 47. The differential gear assemblies 45 thereby permit the servo motors 44 to selectively adjust the rotational position of the camshafts 20 and 36, relative to their respective stub shafts 51. This in turn controls the timing of the camshafts 20 and 36 relative to one another and the engine cycle.

Figure 10A:
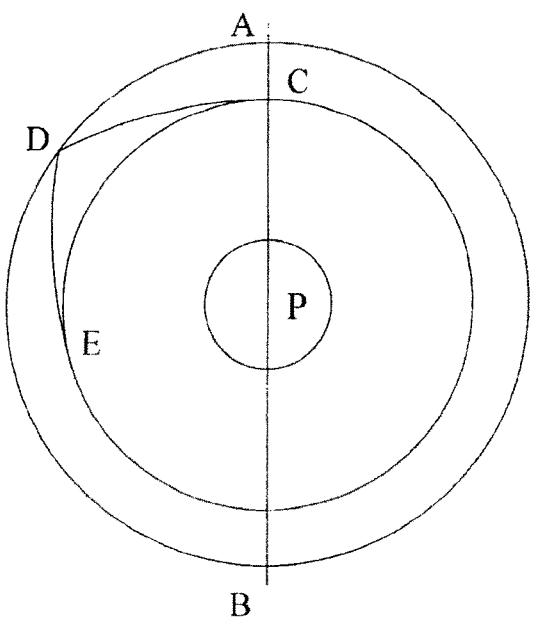
FIGS. 10A, 10B, and 10C are schematic views of a cam profile.
Figure 10B:
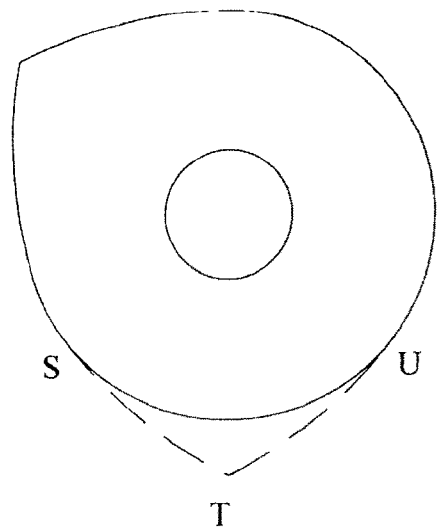
Figure 10C:
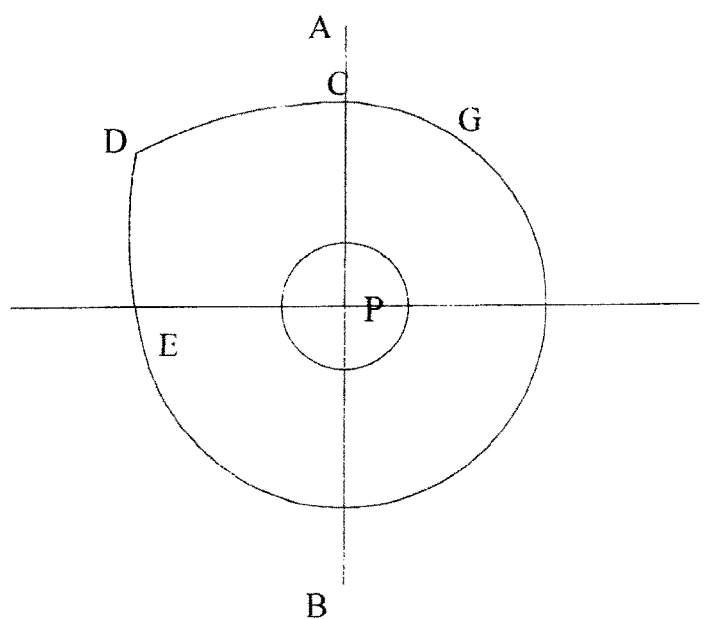
Figure 12A:
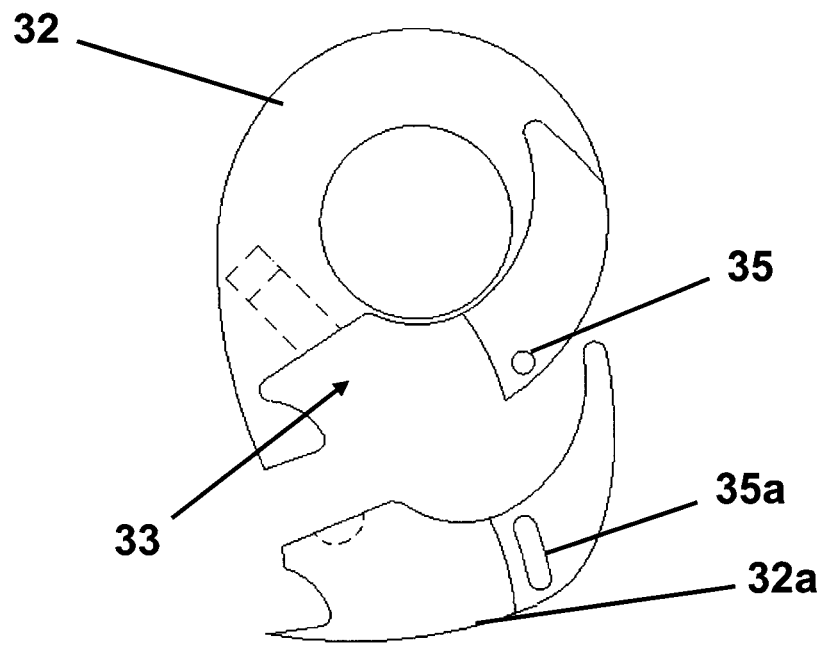
FIG. 12A is a detail view of an alternative embodiment of the cam.
Figure 12B:
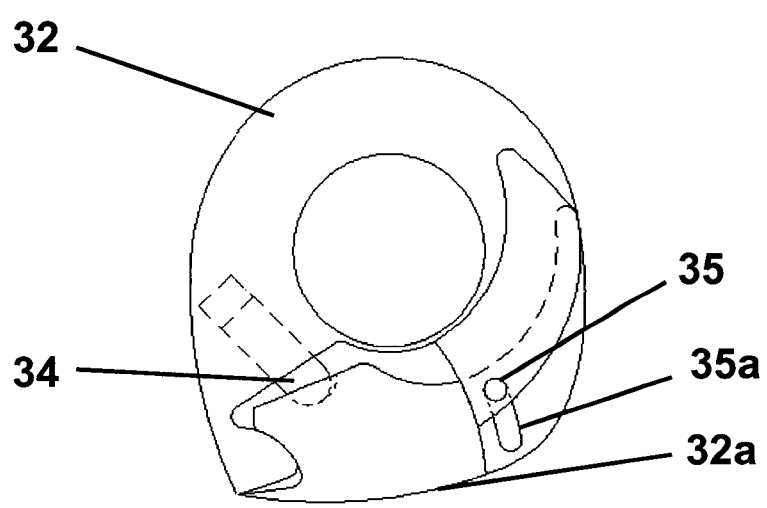
FIG. 12B is another view of the cam shown in FIG. 12A.

FIGS. 10A, 10B, and 10C, show a cam with a basic cam profile. Preferably, the first close cam 38 is the only cam that uses this basic cam profile. The other three cams 18, 22, and 32 use a profile that permits self-adjusting vertical valve seating and incorporates quietening ramps, as described below. As shown in FIGS. 12A and 12B, a cam may also be used having a spring-loaded and outwardly biased cam face to thereby cushion the contact between the cam face and the upper or lower cam follower 30 or 40. The spring-loaded cam face 32a is pivotally mounted within a recess 33 in the cam 32. A spring 34 is positioned extending into the recess and engages the spring-loaded cam face 32a to outwardly bias the cam face 32a. A pin 35 on the cam 32 fits within a channel 35a to limit the pivoting movement of the spring-loaded cam face 32a.

As shown in FIG. 10A, a basic cam profile is illustrated with reference to an inner circle and an outer circle concentric therewith and a vertical line that passes through the centers of the circles and intersects the outer circle at A and B. The basic cam profile has a minimum radius equal to the radius of the inner circle and a maximum radius equal to the radius of the outer circle. One cam face is defined by an arc, with its center at B, from the inner circle at C to the outer circle at D. The other cam face is defined by a mirror image DE of the arc CD, having a mirror axis between the point D and the center of the circles P.

In FIG. 10B, the second cam on the camshaft is illustrated in dotted lines behind the first cam. The cam faces are defined by the arcs ST and TU, with the point of the second cam located at T. With reference to FIG. 10A, the point of the second cam on the camshaft is located at B and the cams are fixed to the camshaft with this relative orientation. The distance between the cam points, at D and B, is equal to the distance between the upper and lower cam followers 30 and 40.

To produce a cam with quietening ramps, a smaller base circle is drawn concentrically inside the inner circle. The quietening ramps are defined by mirror image arcs between the points C and E and the smaller base circle. The minimum radius of a cam with quietening ramps is equal to the radius of this smaller base circle. This type of cam permits valve seating to vary by the difference in radius of the inner circle and the smaller base circle.

As shown in FIG. 2, the camshafts 20 and 36 are horizontally aligned parallel to one another and perpendicular to the direction of valve movement. Alternatively, the camshafts 20 and 36 may be arranged vertically above one another and/or at an angle to one another. The horizontal arrangement is preferred to a vertical arrangement, because it results in a lower cylinder head profile. For certain applications, such as high speed engines, vertically arranged camshafts may be preferable. High speed engines may also use larger cams 18, 22, 32, and 38 to provide faster valve opening and closing movements.

Preferably, the shuttle 100 is configured as shown in FIG. 1. However, alternative shuttle configurations may be used, so long as they maintain required distances between upper and lower cam followers 30 and 40 and drive the movement of a valve portion 26.

During normal operation, the leading cam face on the second close cam 32, defined by the arc ST, passes over the lower cam follower 40 without the leading cam face or cam point contacting it. However, this cam face can act as a safety feature in the event of incorrect positioning of the valve 1. For example, if the shuttle 100 is jolted or otherwise moved off its holding magnet, or if the cams and cam followers fail to complete a valve opening or closing movement, the shuttle 100 may be positioned with the valve 1 between the open and closed positions. This will cause the leading cam face on the second close cam 32 to engage the lower cam follower 40, forcing it down to the normal open position, which corresponds to the height defined by the point T. This permits the valve closing movement to commence correctly when the leading cam face on the first close cam 38 engages the upper cam follower 30. This will allow continued operation of the engine in the short term, until maintenance can be performed to repair the malfunctioning valve assembly.

Figure 11A:
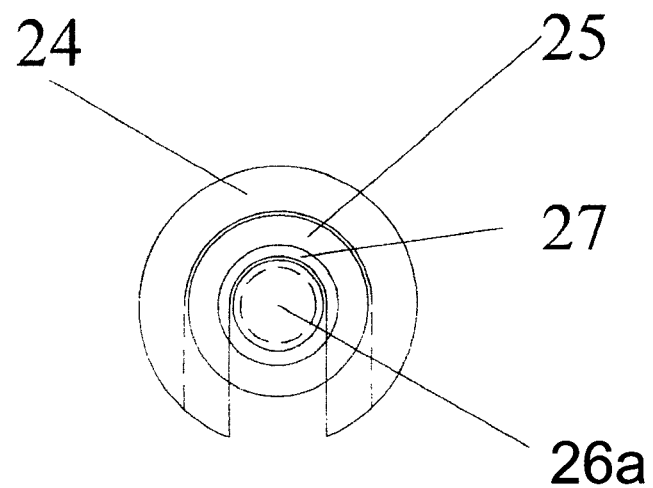
FIG. 11A is a bottom view of the valve stem clamp.
Figure 11B:
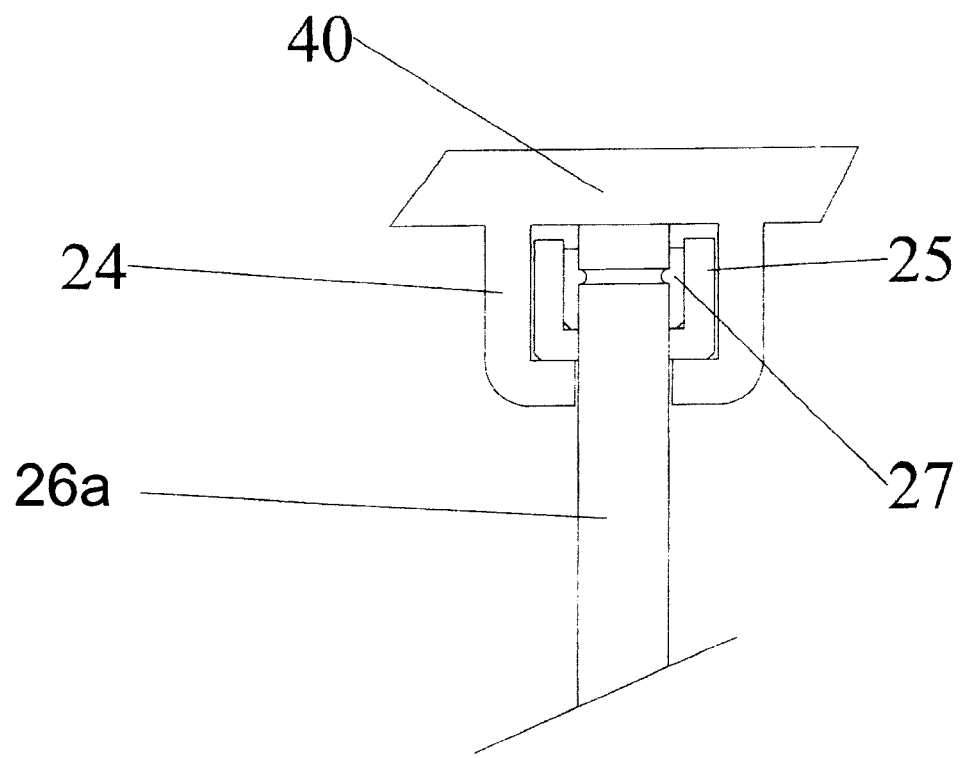
FIG. 11B is a side view of the valve stem clamp.

As shown in FIG. 11, the valve clamp 24 may be configured to provide variable lateral valve seating. A retaining bucket 25 holds in place collets 27 on the valve stem 26*a*. The retaining bucket 25 and collets 27 on the valve stem 26*a* are received and retained within the complementary-shaped valve clamp 24, which forms part of the shuttle 100. The top of the valve stem 26*a* and the bottom of the bucket 25 are snug within the valve clamp 24 while allowing minor lateral movement for lateral valve seating variations.

In another embodiment, self-adjusting vertical valve seating may be provided by configuring the second close cam 32 with a smaller base circle that drops away a further distance from the highest possible valve seating position. The shuttle 100, with the attached valve portion 26, are thereby allowed to move further under their own momentum until the valve head 26*b* seats against the valve seat to arrest its movement.

In another embodiment, the variable duration valve system may be used to deactivate a bank of cylinders in the engine. This is accomplished by preventing ignition and fuel intake while closing the exhaust valves and opening the inlet valves in a valve bank for 360° of crankshaft rotation and opening the exhaust valves and closing the inlet valves for the other 360° of crankshaft rotation. This prevents a pressure or vacuum from building in the cylinder, during the up stroke or down stroke of either 360° rotation. All cylinders in an engine can be deactivated at the same time, resulting in a freewheeling engine.

In another embodiment, the variable duration valve system may be used to implement vacuum braking. This is accomplished by preventing ignition and fuel intake while closing inlet and exhaust valves during a cylinder down stroke, thereby causing the engine to pull against the vacuum created in the cylinder. At the beginning of the up stroke, either of the exhaust or inlet valves are opened, permitting exhaust or inlet gases to enter the cylinder to release the vacuum. As the up stroke is completed, the gases are expelled and the valves may be closed to continue vacuum braking during the following down stroke. Vacuum braking may be implemented to provide either one or two vacuum strokes per engine cycle and may be implemented for individual cylinder banks.

In another embodiment, the variable duration valve system may be used to implement compression braking. This is accomplished by preventing ignition and fuel intake and keeping the inlet valve closed while opening the exhaust valve during the down stroke, to permit exhaust gases to fill the cylinder. The inlet and exhaust valves are then closed during the up stroke, thereby causing the engine to push against the compression created in the cylinder. Alternatively, the inlet valve may be opened during the down stroke and the exhaust valve may be kept closed. For the last down and up stroke of a compression braking cycle and before return to normal operation, the inlet valve is closed and the exhaust valve is opened, thereby allowing the engine to freewheel for this last half of the engine cycle. This expels exhaust gases from the cylinder before the first normal intake stroke. Compression braking may be implemented to provide either one or two compression strokes per engine cycle and may be implemented for individual cylinder banks.

In another embodiment, the variable duration valve system may be used to assist in engine starting. This is accomplished by causing the engine to freewheel, as described above, until its flywheel is rotating at sufficient speed to enable it to compress the minimum cylinder charge needed for ignition. Once an appropriate engine speed is reached, the inlet valves are closed causing normal compression and firing of the cylinders.

A number of embodiments of the present invention have been described. Nevertheless, the embodiments are described herein illustratively and are not meant to limit the scope of the invention, as claimed. Variations of the foregoing embodiments will be evident to a person of ordinary skill and are intended by the inventor to be encompassed by the following claims.

What is claimed is:
1. A valve assembly comprising:
a valve, which moves between an open and closed position with reference to a valve seat on an engine block, having a valve portion and a shuttle portion, wherein the valve portion has a valve stem and a valve head and the shuttle portion has a body with opposing sides, an upper cam follower on one side of the body, and a lower cam follower on the other side of the body;
a first and second cam on a first camshaft for opening the valve;
a first and second cam on a second camshaft for closing the valve;
wherein the first cam on the first camshaft engages the lower cam follower to initiate the opening movement of the valve, and the second cam on the first camshaft engages the upper cam follower to control the opening movement of the valve;
and wherein the first cam on the second camshaft engages the upper cam follower to initiate the closing movement of the valve, and the second cam on the second camshaft engages the lower cam follower to control the closing movement of the valve;
and wherein the valve has a first magnet target corresponding to the open position and a second magnet target corresponding to the closed position that magnetically engage with a magnet to releasably retain the valve in the open or closed position.

2. The valve assembly according to claim 1, further comprising a control device for selectively varying the relative rotational position of each of the first and second camshafts.

3. The valve assembly according to claim 2, wherein the control device comprises a servo motor that operates a differential gear assembly engaged with each of the first and second camshafts.

4. The valve assembly according to claim 1, wherein the shuttle portion has one or more guide sleeves that slidably engage with one or more guide rods fixedly attached to the engine block to align the movement of the valve.

5. The valve assembly according to claim 1, wherein the valve portion is attached to the shuttle portion by way of a retaining bucket which fits on the end of the valve stem and is received and retained within a complementary-shaped valve clamp on the shuttle portion.

6. The valve assembly according to claim 1, wherein one or more of the first and second cams on the first and second camshafts have a cam profile with quietening ramps.

7. The valve assembly according to claim 1, wherein one or more of the first and second cams on the first and second camshafts comprise a spring-loaded outwardly biased cam face.

8. The valve assembly according to claim 1, wherein the shuttle portion has a magnet post extending therefrom aligned with the direction of valve movement with a distal upper end and a proximate lower end;
    wherein the first magnet target is located at the upper end of the magnet post and the second magnet target is located at the lower end of the magnet post; and
    wherein a magnet is slidably fitted on the magnet post and fixedly attached with reference to the engine block.

\* \* \* \* \*